J. N. & J. H. JOHNSON.
MOTOR WHEEL.
APPLICATION FILED MAY 25, 1910.
972,453.
Patented Oct. 11, 1910.
3 SHEETS—SHEET 3.
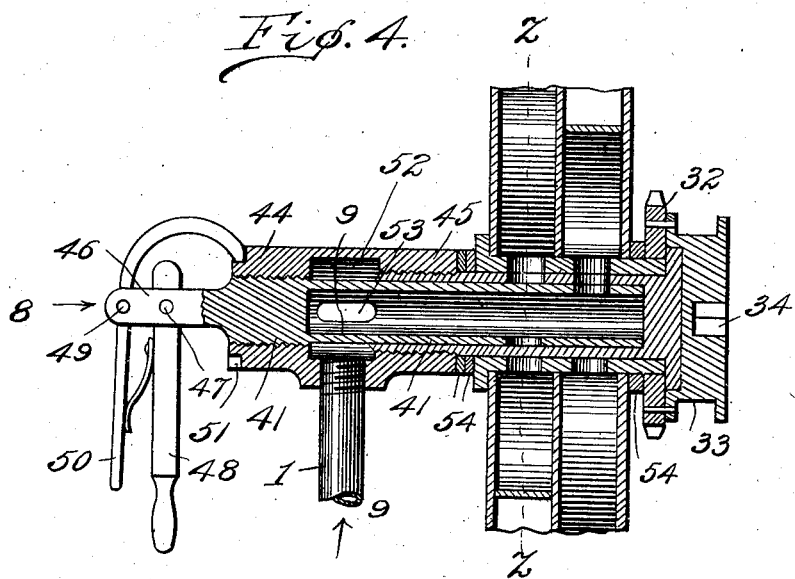
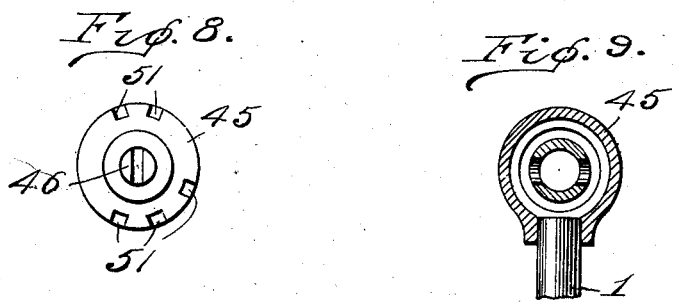
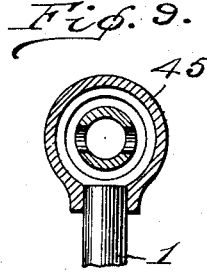
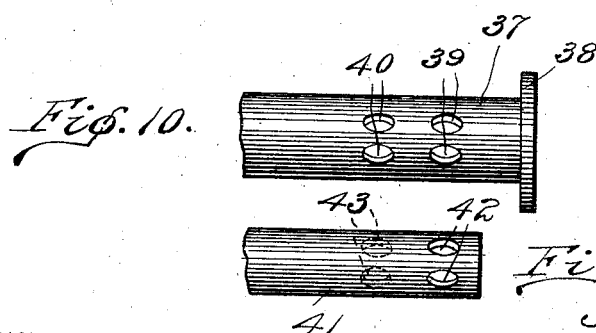
Witnesses
H. Strauss
E. C. Duffy
Inventors
James N. Johnson
John H. Johnson
By
E. N. Bond.
Attorney

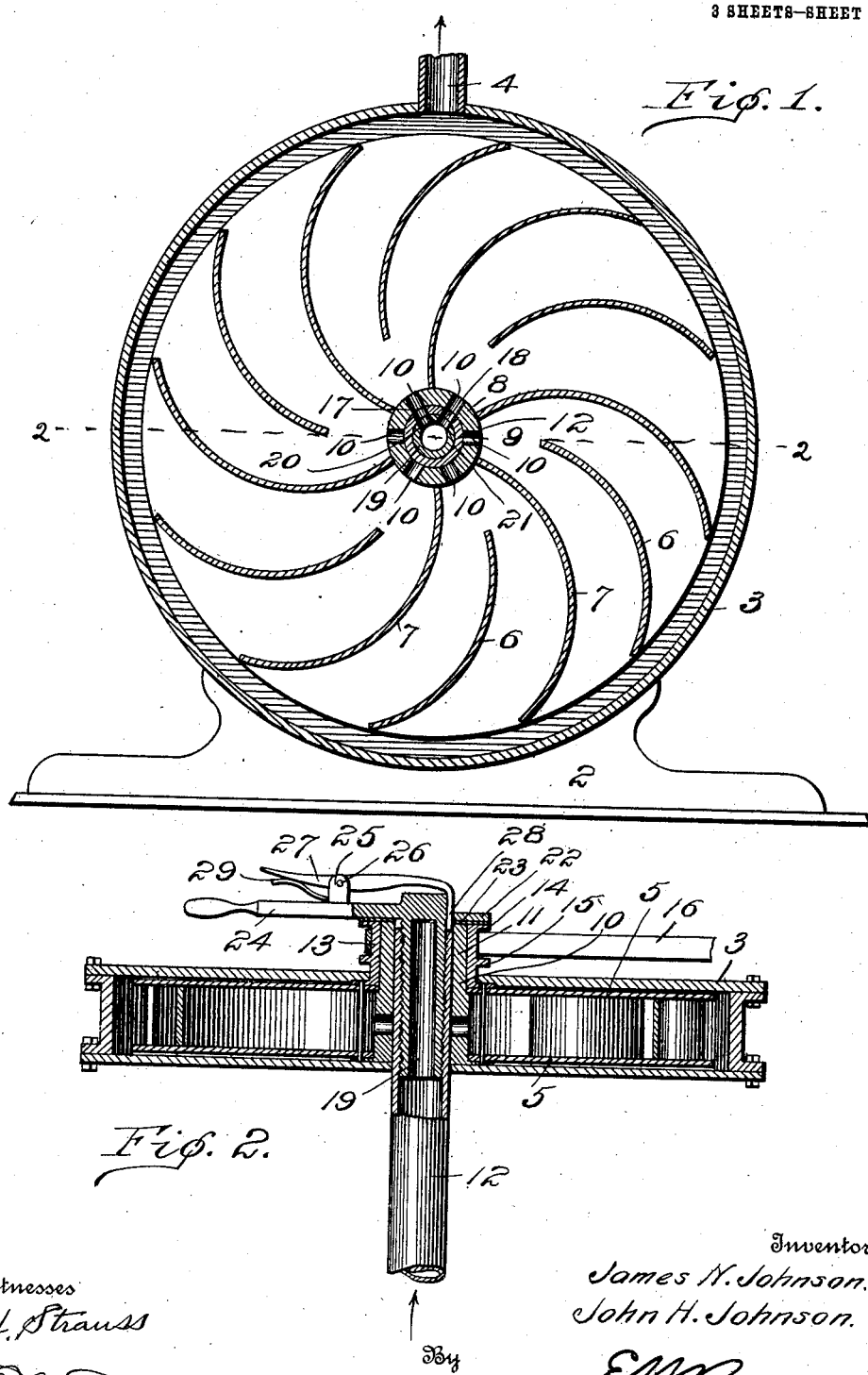

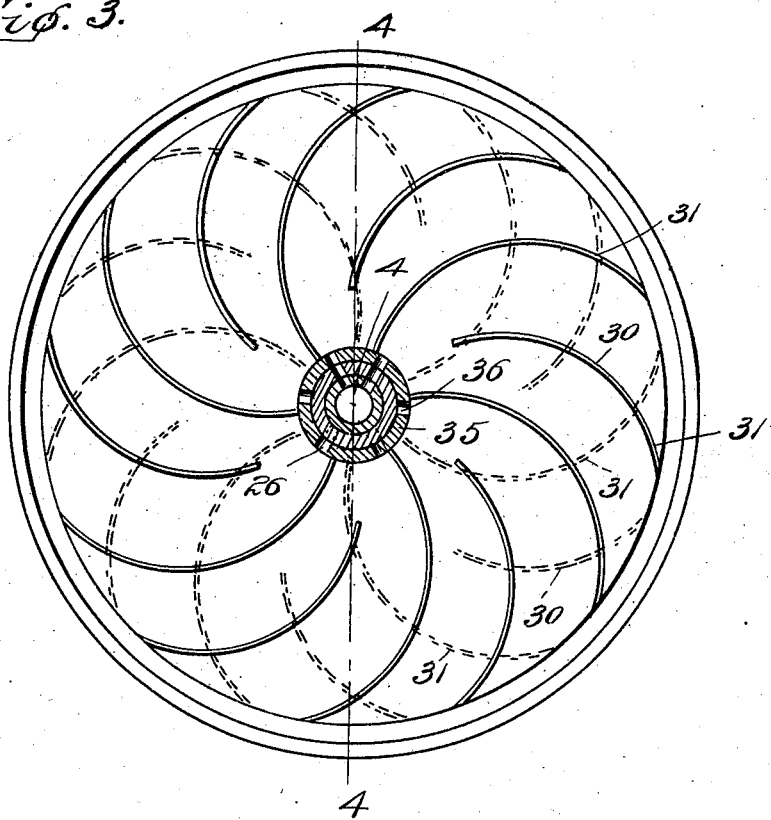

UNITED STATES PATENT OFFICE.

JAMES N. JOHNSON AND JOHN H. JOHNSON, OF FLOMATON, ALABAMA.

MOTOR-WHEEL.

972,453. Specification of Letters Patent. Patented Oct. 11, 1910.

Application filed May 25, 1910. Serial No. 563,334.

*To all whom it may concern:*

Be it known that we, JAMES N. JOHNSON and JOHN H. JOHNSON, citizens of the United States of America, and residents of Flomaton, in the county of Escambia and State of Alabama, have invented certain new and useful Improvements in Motor-Wheels, of which the following is a specification.

This invention relates to certain new and useful improvements in motor wheels, and it has for its objects among others to provide a simple and inexpensive motor wheel adapted to be driven by any expansive fluid under pressure, being readily reversible and capable of embodiment as either a single or a compound motor.

The invention has for a further object to provide a construction wherein the inlet of the motive fluid is at the axis of the wheel and provision made for equal distribution thereof to the different blades, and in such a manner as to take the weight off of the wheel proper and reduce the friction on the bearings to a minimum. We form the axle hollow and into this axle we thread the throttle which serves not only as a cut-off, but as a brake and a lock for the wheel. The ports in the throttle are so disposed that when the wheel is in motion, the motive fluid is at all times directed in an upward direction.

We provide for the transmission of power from the wheel to the required point by means of sprocket and chain or belt connection, and further provide for the connection of a shaft with said wheel whereby the power may be transmitted to any desired distant point.

The wheel may be mounted directly upon a pipe connected with a steam boiler, or with any other suitable source of motive fluid.

We guard against waste of the steam or motive fluid whereby the maximum amount thereof is utilized, and at a point where attainment of the best results is assured.

Other objects and advantages of the invention will hereinafter appear and the novel features thereof will be particularly pointed out in the appended claims.

The present invention is capable of embodiment in a variety of forms, the preferred ones only of which are herein illustrated, it being understood, however, that the invention is not restricted to such forms or to the details of construction, proportion of parts etc., as the same is subject to variations, modifications and changes without departing from the spirit of the invention or sacrificing any of its advantages. We, therefore, reserve the right to make such changes, variations and modifications as come properly within the scope of the protection prayed.

The invention as herein disclosed is clearly illustrated in the accompanying drawings, which, with the numerals of reference marked thereon, form a part of this specification, and in which—

Figure 1 is a substantially central section through the wheel with the throttle shown in position for full speed. Fig. 2 is a section on the line 2—2 of Fig. 1. Fig. 3 is an elevation with the shaft and throttle in cross section showing a compound wheel. Fig. 4 is a section through the same as on the line 4—4 of Fig. 3. Fig. 5 is a cross section through the shaft and the hub of the wheel and the throttle showing the parts in position for slow feed. Fig. 6 is a similar cross section showing the parts in the position they assume when the engine is cut off. Fig. 1 is a cross section through Fig. 4 showing the position of the parts when reversing. Fig. 8 is an end view of Fig. 4 looking in the direction of the arrow 8, with the throttle lever removed. Fig. 9 is a section on the line Z—Z of Fig. 4. Fig. 10 is an elevation of a portion of the outer tube, and Fig. 11 a similar view of a portion of the inner tube of the device seen in Fig. 4.

Like numerals of reference indicate like parts in the several views.

In carrying out our invention the wheel may be supported in any suitable manner. We prefer to mount it upon a pipe 1, as shown for instance in Fig. 4, which may be a pipe connected with and designed to receive steam from a steam boiler, although it is evident that this pipe may be connected with any other suitable source of motive fluid. It is evident, however, that said wheel instead of being thus supported, may sometimes be mounted upon a suitable base or support 2 which may be attached to any suitable fixed part, whereby the wheel is supported in the desired position with relation to the other parts. This manner of supporting, however, is one that may be varied and hence the invention in its other respects is in no wise restricted to the mode of mounting of the wheel.

The wheel in its simplest form embodies a casing 3, as seen in Figs. 1 and 2, the same provided with a suitable exhaust pipe 4. This casing may be constructed in any suitable manner adapted to the purpose. Within this casing are the disks 5—5 between which and joined to the inner faces 7 of which are the curved blades 6 and 7, the shorter blades 6 being arranged between each two of the longer blades 7, it being seen upon reference to Fig. 1 that the longer blades 7 extend from the hub 8 to which they are connected, while the shorter blades 6 terminate at a distance from said hub, leaving a space 9 between the inner ends of said short blades and the hub. Thus there are formed a plurality of chambers between these disks, each chamber comprising the space between two curved blades 7 and this chamber being divided by the shorter blades 6. The hub 8 has a plurality of radial ports 10 one for each of said chambers, as is clearly illustrated in Fig. 1.

The hub 8 has a tubular extension 11, as seen best in Fig. 2, and in this extension is mounted the hollow shaft 12 upon which the hub and wheel freely rotate. On this extension is a sleeve 13 provided with flanges 14 and 15 constituting a pulley about which is designed to be placed a belt 16, whereby power may be transmitted therefrom to any suitable place and for operating any desired device. This sleeve is fast to the disks, as seen in Fig. 2, so as to revolve therewith, as will be readily understood.

The portion of the shaft 12 within the hub of the wheel is provided with the ports 17 and 18, as seen clearly in Fig. 1. As seen therein, these ports are disposed at an angle to each other and upon the upper side of the shaft so that steam or other motive fluid entering through the shaft will be directed upward, so as to take the pressure of the wheel off of its shaft, so as to reduce the friction to a minimum.

19 is the throttle valve. It is exteriorly threaded and engages interior threads on the portion of the shaft 12 within the hub, being rotatable in order to control the flow of motive fluid to the interior of the wheel. It is provided with two ports 20 and 21, as seen best in Fig. 1, which ports are so disposed as to extend upwardly to admit the motive fluid in an upward direction into the chambers of the wheel, the said ports being arranged at an angle to each other corresponding to those of the shaft 12. When this throttle valve is in the position seen in Fig. 1, the parts are in the position to drive the wheel at full speed. When they are in the position in which they are seen in Fig. 5, it is to be noted that the supply is cut off one-half and the wheel will, therefore, be operated at slow speed. When the throttle valve is turned into the position seen in Fig. 6, the engine will be cut off, it being noted that communication between the source of supply and the shaft and the ports of the hub of the wheel is entirely cut off.

The throttle valve has rigid or integral therewith a collar or cap portion 22, as seen in Fig. 2, and interposed between the same and the adjacent end of the extension 11 and the sleeve 13 is a washer or packing disk 23, in order to insure fluid-tight joint thereat. This cap has an extension 24 forming a throttle lever and extending therefrom are lugs or ears 25 between which is pivotally mounted, as at 26, a lever 27, one end of which is turned at an angle thereto, as seen at 28, and adapted to engage one or another of openings in the cap 22, so as to hold the throttle valve in its adjusted position.

29 is a spring interposed between the free end of the lever 27 and the lever 24, as seen clearly in Fig. 2, tending to normally keep the bent end 28 of the lever in engagement with its notch or opening, so as to prevent accidental movement of the throttle valve.

By entire removal of the throttle valve, which may be readily done by unscrewing, the wheel may be taken from its shaft so as to examine the interior thereof or to make any repairs that may be necessary.

The mode of operation will be readily understood. The shaft 12 may be mounted upon or put in communication with a pipe, such as 1 seen in Fig. 4, which may be a pipe mounted upon a steam boiler or in connection with any other suitable source of motive power. When the throttle valve is turned into the position seen in Fig. 1 and the motive fluid admitted, it passes through the ports 20 and 21 of the throttle valve, through the ports 17 and 18 of the hollow shaft and through the coincident ports 10 of the hub of the wheel. The motive fluid entering the chambers of the wheel expands and by impact rotates the wheel within the casing at full speed. When the throttle valve is turned into the position seen in Fig. 5, the ports thereof are caused to assume a position with relation to the ports of the hollow shaft and the corresponding ports of the hub, so that the ports of the throttle are about one-half closed as are those of the hollow shaft. Under these conditions, the motive fluid being cut off about one-half, the wheel will revolve at a proportionately lower speed. When the throttle valve is turned into the position seen in Fig. 6, the motive fluid is entirely cut off and the motor wheel ceases to revolve. Furthermore, when the throttle valve is turned into the position to entirely cut off the motive force, the cap or flange thereof is caused to bear against the washer 23 and to force the same against the end of the hub extension and of the sleeve 13 sufficiently to form a brake and to lock the wheel.

In Figs. 3 and 4 we have shown the embodiment of the invention in a compound motor wheel, there being two sets of chambers and short blades 30 and long blades 31, the blades of the one set being disposed in a direction opposite to those of the other, as indicated clearly in Fig. 3, by full and dotted lines, and also clearly in Fig. 4. In this form also we have shown a sprocket wheel 32 for coöperation with a sprocket chain, whereby the power may be transmitted to any desired point, and we have also shown a belt pulley 33 for analogous purpose. Furthermore, the belt pulley 33 is provided in its outer face with a rectangular socket 34 for the reception of a correspondingly shaped end of a shaft, not shown, by which the power may be transmitted to any desired point, as for instance, by means of said shaft when in use upon a boat, for operating the propeller wheel, or for any other purpose. In this form, the hub 35 is provided with the ports 36, one for each chamber, the ports being duplicated, as seen clearly in Fig. 4, there being one set for each of the series of chambers or for each valve of the compound wheel, the sprocket 32 and the band or belt pulley 33 being secured to and revoluble with the said hub. In this instance, the outer tube or hollow shaft 37 which is provided with the disk-like portion 38 which is confined between the sprocket wheel and the belt pulley 33, as seen in Fig. 4, is provided with two sets of ports 39 and 40 for an obvious purpose. The throttle valve 41 is revoluble within the outer tube or hollow shaft 39 and with ports 42 and 43 for coöperation with the ports 40, it being understood that the ports 42 and 43 are upon diametrically opposite sides of the throttle valve, as indicated clearly in Figs. 4 and 11. At its outer end, the throttle valve 41 is screw-threaded, as seen at 44, and these threads engage similar threads within the tubular member 45 which is also interiorly threaded at its inner end to receive interengaging threads on the inner tube or hollow shaft 37. This throttle valve has the extension 46 upon which is pivotally mounted, as at 47, the throttle valve lever 48 and also at 49 the lever 50, the other end of which is adapted to engage in notches or the like 51 in the end of the tubular member 45, as seen clearly in Figs. 4 and 8. The tubular member 45 has the annular chamber 52, as seen clearly in Figs. 4 and 9, into which the steam or motive fluid is directed through the pipe 1 and thence through a port 53 in the throttle valve into the interior of the latter and thence through its ports to the chambers of the wheel.

Fig. 8 shows the position of the ports of the hub, the hollow shaft and the throttle valve when the parts are in position for reversing. The mode of operation of this construction is substantially the same as that in the single wheel illustrated in Figs. 1 and 2 and hereinbefore described, it being understood that when the throttle valve is thrown into one position, steam or other motive fluid is introduced through the pipe 1 and the chamber into which it communicates, and thence through the throttle valve into the proper chambers of the compound wheel. Reversal of the position of the throttle valve by the throttle valve lever admits the motive fluid through the other ports in the opposite direction and, consequently, reverse rotation is given to the wheel.

As seen in Fig. 4, suitable packing rings or the like 54 are provided to guard against leakage.

While the ports 10 in the hub of the wheel may be differently located relatively to the longer blades, we find it advantageous to arrange them as seen in Fig. 3 so that the motive fluid passing therethrough will be delivered in close proximity to the longer blades and thus we obtain the best results by getting the direct impact of the motive fluid against the longer blades in proximity to their connection with the hub. By this means, there is no loss of power for the reason that we get the full force of the motive fluid throughout the entire length of the blades.

What is claimed as new is:—

1. In a motor wheel, a non-rotatable hollow shaft having radial openings, a wheel with blades revoluble on said shaft, the hub of said wheel having radial openings, and a throttle valve revolubly mounted within said shaft and having radial openings for coöperation with the openings of the said shaft and hub.

2. In a motor wheel, a non-rotatable hollow shaft, a wheel with blades revoluble on said shaft, and means for admitting a motive fluid at the axis of said wheel and delivering it upwardly only to relieve the weight of the wheel from its bearing.

3. In a motor wheel, a hollow shaft, a wheel rotatable thereon, means for admitting motive fluid through said shaft to the interior of the wheel and delivering it in an upward direction only, and means within said shaft for controlling such fluid.

4. In a motor wheel, a non-rotatable hollow shaft, a wheel rotatable thereon, means for admitting motive fluid through said shaft and the hub of the wheel in an upward direction, and a revoluble throttle valve within said hollow shaft.

5. In a motor wheel, a non-rotatable hollow shaft, a wheel revoluble thereon, means for admitting a motive fluid to said shaft and through the hub of the wheel in an upward direction, and a throttle valve revoluble within said hollow shaft and having upwardly disposed ports.

6. In a motor wheel, a hollow shaft, a wheel revoluble thereon, means for admitting a motive fluid through said shaft and through the hub of the wheel, and a throttle valve and means coöperating therewith constituting also a brake for the wheel.

7. In a motor wheel, a hollow shaft, a wheel revoluble thereon, means for admitting a motive fluid through said shaft and through the hub of the wheel, and a throttle valve and means coöperating therewith constituting a brake and a lock for the wheel.

8. In a motor wheel, a non-revoluble hollow shaft, a wheel rotatable thereon, a hollow support surrounding said shaft and a throttle valve having threaded engagement within said hollow support.

9. In a motor wheel, a non-revoluble hollow shaft having upwardly extended openings, a wheel revoluble thereon and having a hub with radial openings, a hollow support surrounding said shaft and a throttle valve having threaded engagement within said hollow support and having openings upon its upper side.

10. In a motor wheel, a non-revoluble hollow shaft having upwardly extended openings, a wheel revoluble thereon and having a hub with radial openings, a hollow support surrounding said shaft a throttle valve having threaded engagement within said hollow support and having openings upon its upper side, and means for revolving said throttle valve and holding it in its adjusted positions, and means coöperating with said valve and serving as a brake and a lock for the wheel.

11. In a motor wheel, a non-rotatable hollow shaft, a pipe supporting the same for connection with a source of motive fluid, a wheel rotatable on said shaft, means for delivering the motive fluid in an upward direction through the hub of the wheel, and a throttle valve having threaded engagement with the interior of a hollow member embracing said shaft.

12. In a motor wheel, a non-rotatable hollow shaft, a pipe supporting the same for connection with a source of motive fluid, a wheel rotatable on said shaft, means for delivering the motive fluid in an upward direction through the hub of the wheel, and a throttle valve having threaded engagement with the interior of a hollow member embracing said shaft, said wheel having sets of blades with the one set oppositely disposed to the other set.

13. In a motor wheel, a non-revoluble hollow shaft, a compound wheel revoluble thereon with means for admitting the motive fluid through the hub of the wheel in an upward direction, and a throttle valve revoluble within the hollow shaft.

14. In a motor wheel, a non-revoluble hollow shaft, a compound wheel revoluble thereon with means for delivering the motive fluid in an upward direction through the hub of the wheel, a throttle valve revolubly mounted within said shaft, and means whereby the throttle valve constitutes a brake and lock for the wheel.

15. In a motor wheel, a wheel with curved blades and a hub with radial openings, a hollow shaft upon which said wheel is revoluble, hollow means supporting said shaft and adapted to convey a motive fluid through said shaft and the hub of the wheel, and a throttle valve having rotary movement within the shaft.

16. In a motor wheel, a hollow shaft, a pipe supporting the same and holding it against rotation and adapted to deliver a motive fluid into said shaft, a wheel with blades mounted to revolve on said shaft, and a coaxial throttle valve revoluble within the shaft.

17. In a motor wheel, a hollow shaft with openings upon its upper side, a pipe supporting said shaft and communicating therewith to deliver a motive fluid thereto, a hollow support for said shaft a wheel revoluble on said shaft and having a hub with radial ports, and a throttle valve threaded within said hollow support and having ports upon its upper side.

18. In a motor wheel, a non-rotatable hollow shaft, a wheel mounted to revolve thereon and comprising disks with a series of independent curved blades therebetween and a hub with radial ports adjacent the junction of the blades therewith whereby loss of power is prevented and the entire force of the motive fluid is utilized.

Signed by us at Flomaton, Ala., this 23 day of May 1910.

JAMES N. JOHNSON.
JOHN H. JOHNSON.

Witnesses:
THOMAS A. BEDGOOD,
E. McCURDY.